R. J. SAVAGE & C. E. SCHULTZ.
CANDY MAKING MACHINE.
APPLICATION FILED JULY 5, 1913.
1,123,933.
Patented Jan. 5, 1915.
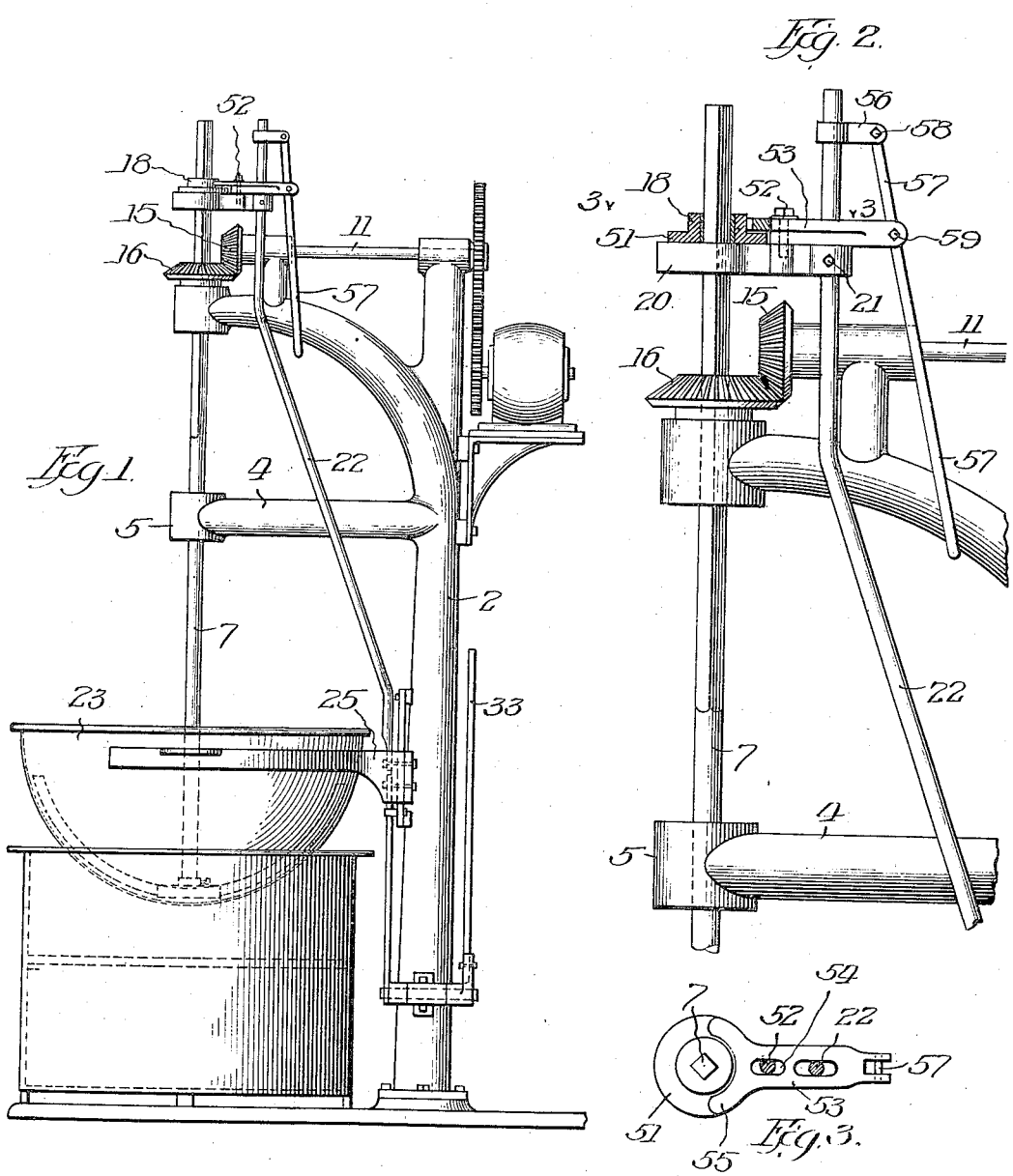

UNITED STATES PATENT OFFICE.

RICHARD J. SAVAGE AND CHARLES E. SCHULTZ, OF CHICAGO, ILLINOIS.

CANDY-MAKING MACHINE.

1,123,933. Specification of Letters Patent. Patented Jan. 5, 1915.

Application filed July 5, 1913. Serial No. 777,427.

*To all whom it may concern:*

Be it known that we, RICHARD J. SAVAGE and CHARLES E. SCHULTZ, citizens of the United States, residing at Chicago, in the county of Cook and State of Illinois, have invented certain new and useful Improvements in Candy-Making Machines, of which the following is a specification.

This invention consists in certain new and useful improvements upon the candy-making machine shown and described in our United States Patent No. 1,040,427, dated October 8, 1912, and the primary object of the invention is to provide a means for causing the vertical shaft to move in unison with the kettle.

In the drawings, Figure 1 is a side elevation of the machine; Fig. 2 is a side elevation on an enlarged scale as compared to Fig. 1, showing the salient feature of this improvement; and Fig. 3 is a detail looking downwardly from the line 3—3, Fig. 2.

As more fully described in our said prior Patent No. 1,040,427, the machine comprises a post or column 2, arm 4, and perforated head 5 within which head the rotating shaft 7 is journaled. Said shaft is squared at its upper end and the miter gear 16, which meshes with and is driven by a corresponding gear 15 upon one end of the rotating shaft 11, causes said shaft 7 to be revolved. An arm 22 extends from the wishbone or yoke 25, which retains the kettle 23, and when the lever 33 is rocked, the kettle-holder 25 and arm 22 are caused to rise and fall in unison. The collar 18 is secured to the shaft 7 and a yoke 20, which is fastened at 21 to the arm 22, engages the collar 18 upon its under surface and in this manner elevation of the rod 22 causes the shaft 7 to move in unison therewith. All other parts shown in the drawings and designated therein by reference numerals 1 to 50, inclusive, are identical with the correspondingly numbered parts of our said prior Patent No. 1,040,427, and the construction and operation is fully described in said prior patent.

It has been found by actual practice that to shift the lever 33 would elevate both the kettle 23 and the shaft 7 in unison, and that when said parts were moving upwardly, they would move at the same rate of speed; but when the kettle is allowed to drop, as more particularly explained in our said prior patent, the shaft 7 would sometimes not descend as readily as the kettle itself, since in the machine of said prior patent, gravity alone was relied upon to carry both the kettle and the shaft 7 downwardly; and since the shaft 7 had more friction to overcome than did the kettle, the shaft 7 would sometimes bind or stick. In cases where the machine was being used to cook a batch of candy containing nuts or the like, or for very heavy mixtures, the result has been that sometimes the scrapers 43 would become lifted off the bottom of the kettle and separated therefrom by a space of half an inch or more, because some nut or similar article would creep in between the bottom of the scraper and the floors of the kettle. It is desirable, for obvious reasons, that the scraper 43 or the chain retained therewithin actually engage the surface of the kettle, and where such a result is not attained, a layer of candy or candy mixture will collect upon the kettle, without being scraped off or removed, which layer would sometimes be burned and thus impair the flavor of the entire batch.

It is the primary object of this invention so to construct the machine that the shaft 7 moves in unison with the kettle, whether the parts be moving up or down. In the machine of our said prior patent, the shaft 7 and the kettle 23 were certain to move in unison when traveling upwardly, but not certain so to move when traveling downwardly; but this invention makes it certain that the shaft and the kettle will move in unison, regardless of the direction of travel.

As best shown in Fig. 2, the collar 18, which is secured by a suitable screw to the shaft 7, is provided with flange 51. The yoke 20 which is secured at 21 to the arm 22, engages said collar 18 upon the under surface just as in our said prior patent, although the yoke may be somewhat different in shape from that depicted in the drawings of our said prior patent. Projecting into the yoke 20 is a screw 52 and the bar 53 is provided with a slot 54 within which the screw 52 is received. At its left-hand end the bar 53 bears fingers 55 which reach over the flange 51.

Secured to the rod 22 is a bracket 56 to which the lever 57 is pivoted at 58 and said lever 57 is connected to the bar 53 by the pin 59. By means of the lever 57, the bar 53 may be moved toward or away from the shaft 7 in an obvious manner. When the parts are in the position depicted in the drawings, the bar 53 will engage the upper surface of the flange 51 and as the rod 22 descends it will carry therewith the bar 53, which bar, by pressing upon the flange 51, will surely and certainly cause the shaft 7 to move in unison with the rod 22 and the kettle 23. When the kettle is elevated, the yoke 20 will raise the shaft 7 just as set forth in our said prior patent, and, as will be obvious, this invention consists in the attachment of the devices which connect the rod 22 to the shaft 7 shown at the top of Figs. 1 and 2.

Whenever the arm 22 is being depressed the bar 53 will bear downwardly upon the flange 51 and the collar 18 will be between the fingers 55 and the yoke 20, thus making sure that the rod 22 and shaft 7 will move in unison, whether traveling up or down; but if the lower end of the lever 57 be moved toward the right, Fig. 2, the fingers 55 are carried clear of the flange 51 and the connection between shaft 7 and rod 22 is released. Under such circumstances, therefore, the rotating shaft 7 may be lifted out of the kettle and the operating parts cleaned, adjusted, or repaired. In other words, if the lower end of the lever 57 be thrown toward the right, the shaft 7 may be raised without regard to the movement or movements of the arm 22; but when the parts are in the position depicted in the drawings, the arm 22 and shaft 7 are locked together at all times.

The precise form of the device for locking the arm 22 and shaft 7 together may be varied in an obvious manner, and sundry other changes in the details of construction may be made, without departing from the scope of the invention or of the various claims.

We claim as our invention:

1. A candy-making machine comprising a kettle, a yoke supporting the same, a rotating shaft, an arm connected to said kettle-supporting means, a collar upon said shaft, means fixed upon said arm, and adapted to bear downwardly upon said collar, and means for reciprocating said kettle-supporting means.

2. A candy-making machine comprising a kettle, a yoke by which same is supported, a rotating shaft, an arm adapted to raise or lower the same, means connecting said arm to said kettle-supporting means, a collar upon said rotating shaft, means upon the arm adapted to bear downwardly upon said collar, and means intermediate said lever and said kettle-supporting means whereby said lever is adapted to raise or lower said kettle and said rotating shaft.

3. A candy-making machine comprising a kettle, a yoke supporting the same, a rotating shaft, an arm adapted to raise or lower said shaft and connected to said kettle-supporting means, a collar upon said shaft, a bar in connection with said arm and adapted to bear downwardly upon said collar, and means for moving said bar toward or away from said shaft and beyond the path of travel of said collar.

4. A candy-making machine comprising a kettle, a yoke supporting the same, a rotating shaft, an arm adapted to raise or lower said shaft and connected to said kettle-supporting means, a collar upon said shaft, a bar in connection with said arm and adapted to engage one surface of said collar, a yoke secured to said arm and adapted to engage the other surface of said collar, and means for moving said bar toward or away from said shaft and beyond the path of travel of said bar.

In testimony whereof we hereunto affix our signatures in the presence of two witnesses.

RICHARD J. SAVAGE.
CHARLES E. SCHULTZ.

Witnesses:
ROBT. KLOTZ,
DAVID B. JOHNSON.